United States Patent [19]

Verbiscar

[11] 3,742,022
[45] June 26, 1973

[54] CARBAMATE ESTERS OF PHYSIOLOGICALLY ACTIVE PHENENTHYLAMINES

[76] Inventor: Anthony J. Verbiscar, 160 E. Montecito Avenue, Sierra Madre, Cailf. 91024

[22] Filed: Mar. 8, 1971

[21] Appl. No.: 122,140

Related U.S. Application Data

[63] Continuation-in-part of Ser. No. 636,650, May 8, 1967, Pat. No. 3,600,427, which is a continuation-in-part of Ser. No. 338,289, Jan. 17, 1964, abandoned.

[52] U.S. Cl............ 260/471 C, 260/340.2, 260/999
[51] Int. Cl. ........................................ C07c 125/06
[58] Field of Search...................... 260/340.2, 471 C

[56] References Cited
UNITED STATES PATENTS
3,634,490   1/1972   Carr et al...................... 260/471 C

*Primary Examiner*—Lorraine A. Weinberger
*Assistant Examiner*—L. Arnold Thaxton
*Attorney*—Mason, Kolehmainen, Rathburn & Wyss

[57] ABSTRACT

Carbamate esters of physiologically active phenethylamines (e.g., amphetamine and ephedrine) are disclosed. These carbamates have ester moieties which are easily hydrolyzed in body fluids to release the phenethylamines at selected sites within the body.

10 Claims, No Drawings

CARBAMATE ESTERS OF PHYSIOLOGICALLY ACTIVE PHENENTHYLAMINES

CROSS REFERENCE TO RELATED APPLICATIONS

This application is a continuation-in-part of my copending application Ser. No. 636,650 filed May 8, 1967, now U.S. Pat. No. 3,600,427 granted Aug. 17, 1971, which is a continuation-in-part of my application Ser. No. 338,289 filed Jan. 17, 1964, now abandoned.

This invention relates to phenethylcarbamate esters which are readily hydrolyzed in body fluids to release phenethylamines which are physiologically active.

BRIEF SUMMARY OF THE INVENTION

The phenethylcarbamates which comprise this invention are represented by the following general formula

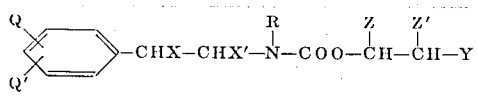

wherein Q and Q' are selected from hydrogen, halogen, hydroxyl, lower alkoxy and benzyloxy substituents or together can be a carbonyldioxy radical, X is hydrogen or hydroxyl, X' is hydrogen or lower alkyl, R is hydrogen or lower alkyl, Z is lower alkoxycarbonyl, carboxyl or hydrogen, Z' is nitro, phenyl or hydrogen, and Y is hydrogen or lower alkyl, but Z and Z' are not both hydrogen. These compounds are derivatives of physiologically active phenethylamines. The ester moieties which are released as alcohols on biological hydrolysis have low toxicity.

DETAILED DESCRIPTION OF THE INVENTION

As explained more fully in my copending application Ser. No. 636,650, now U.S. Pat. No. 3,600,427, Aug. 17, 1971, which is incorporated herein by reference, it is possible to make physiologically active amines available at the proper site in mammals for biological activity by modifying such amines to produce carbamates which in vivo liberate the parent physiologically active amine at the appropriate site in mammals. This is achieved by converting physiologically active amines into certain relatively easily hydrolisable carbamates whereby it is possible to control the selective absorption, penetration rate or release of the physiologically active amines and achieve prolongation of drug action at preselected sites in mammals. These ends are accomplished by converting the physiologically active amines into carbamates which can be selected to affect lipoid solubility, as well as solubility in other body fluids. When the carbamate reaches the preselected site, it is hydrolyzed physiologically to release the amine so that the latter may exert its physiological influence at that site.

The ester radical represented by the moiety

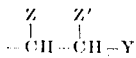

in the general formula above is so selected as to assist biological hydrolysis anchimerically to release the physiologically active phenylethylamine. The carbamates exhibit biphasic effects in mice, including reduction in body tension and central and mild autonomic activity. The phenylethylamines which are released are central nervous stimulants and sympathomimetic drugs. The physiological properties of this class, particularly amphetamine, ephedrine and dopamine, are well established.

In the general formula above, the lower alkoxyl radicals which Q and Q' can represent as those containing one to four carbon atoms, such as methoxyl and ethoxyl. The lower alkyl radical that X' and Y can represent and the alkoxyl group in the alkoxylcarbonyl substituent represented by Z also contain one to four carbon atoms, preferably methyl and ethyl.

The invention is disclosed in more detail by means of the following examples which are provided for purposes of illustration only. It will be understood by those skilled in the art that various modifications in reagents, operating conditions and the like may be made within the scope of the invention as disclosed herein.

EXAMPLE 1

Carbamate from Ethyl Lactate and Amphetamine

A mixture of 5.53 g. of DL-amphetamine sulfate, 3.4 g. of sodium carbonate, 50 ml. of chloroform and 20 ml. of water was cooled to 10°C. A solution of 5.8 g. of ethyllactyl chloroformate [α-carbethoxyethyl chloroformate] in 20 ml. of chloroform was added with good stirring over 10 minutes, keeping the temperature between 10°–15°C. After an hour the cooling bath was removed and the mixture was allowed to stir for 0.5 hours at room temperature, after which time carbon dioxide was no longer evolved. The organic layer was separated and washed successively with 20 ml. of 5 percent hydrochloric acid, 20 ml. of water, and dried over sodium sulfate. The solvent was evaporated leaving an oil which was taken up in 30 ml. of petroleum ether, decolorized with charcoal, filtered and the filtrate cooled in the refrigerator. The 6.8 g. of clear, colorless oil which precipitated gave a single spot on thin layer chromatography, showed infrared absorption peaks at 5.67 microns and 5.76 microns, and gave a correct elemental analysis for the ethyllactate carbamate of DL-amphetamine [α-carbethoxyethyl α-methyl-β-phenylethylcarbamate]. The product has the formula

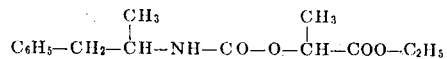

Ethyllactyl chloroformate [α-carbethoxyethyl chloroformate] was prepared as follows: A flask equipped with a stirrer, drying tube, thermometer, and dropping funnel was charged with 400 ml. of solvent A, consisting of 10 percent dry toluene in benzene, and 40 g. of phosgene while cooling in an ice-salt bath. A solution of 35.4 g. of ethyllactate and 36.4 g. of dimethylaniline in 100 ml. of solvent A was added with good stirring over 15 minutes keeping the temperature below 8°C. The solution was stirred in the ice-salt bath for 1 hour longer and then at room temperature for 1.5 hours, after which time a solid precipitated. A 100 ml. portion of water was added, the organic layer was separated and washed successively with 100 ml. of 5 percent hydrochloric acid and 100 ml. of water. After drying over calcium chloride, distillation yielded 36 g. (66 percent of ethyllactyl chloroformate as a clear, colorless lachrymatory oil, b.p. 55°–57°C. at 4 mm. An infrared spec-

EXAMPLE 2

Carbamate from Ethyl Lactate and Ephedrine

This compound [α-carbethoxyethyl N-methyl-α-methyl-β-hydroxy-β-phenylethylcarbamate] was prepared by the procedure of Example 1, but with an equivalent quantity of L-ephedrine sulfate in lieu of the DL-amphetamine sulfate. It was a colorless oil which gave a single spot on thin layer chromatography. It has the formula

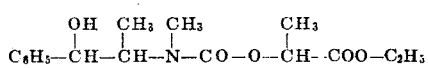

EXAMPLE 3

2-Methyl-2-nitropropyl D-α-methyl-β-phenylethylcarbamate

A mixture of 10 grams (0.027 mole) of D-amphetamine sulfate, 6.2 grams of sodium carbonate, 100 ml. of chloroform and 50 ml. of water was cooled to 10°C. A solution of 11 grams of 2-methyl-2-nitropropyl chloroformate in 30 ml. of chloroform was added over 5 minutes with cooling and then the mixture was stirred for an additional 2 hours at room temperature. The two clear layers were separated, and the chloroform phase was washed with 50 ml. of 5 percent hydrochloric acid, water, then dried over sodium sulfate. The solvent was vacuum evaporated and the resulting oil was recrystallized from petroleum ether (60°–110°) giving 10.53 grams (70 percent) of white crystals, m.p. 55°–57°C. It has the formula

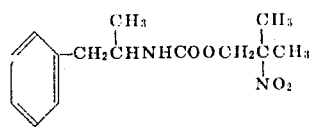

EXAMPLE 4

2-Methyl-2-nitropropyl Phenethylcarbamate

A mixture of 10 grams (0.0635 mole) of β-phenylethylamine hydrochloride, 7.2 grams of sodium carbonate, 50 ml. of water, 100 ml. of solvent A (benzene: toluene, 9:1) and 12.7 grams of 2-methyl-2-nitropropyl chloroformate was reacted as in Example 3. Workup yielded an oil which recrystallized from petroleum ether (60°–110°) to give 13.2 grams (78 percent) of product as long white needles, m.p. 61°–63°C. It has the formula

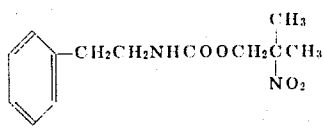

EXAMPLE 5

2-Methyl-2-nitropropyl 4-chloro-β-phenylethylcarbamate

A mixture of 10 grams (0.0643 mole) of 2-(p-chlorophenyl) ethylamine, 3.82 grams of sodium carbonate, 40 ml. of water, 100 ml. of solvent A and 12.7 grams of 2-methyl-2-nitropropyl chloroformate was reacted as in Example 3. The workup yielded 19 grams (98 percent) of an oil which was homogeneous on thin layer chromatography, using Merck silica gel G, 95:5 benzene:methanol developer, iodine detection, with an $R_f 0.71$. Recrystallization from isopropyl ether petroleum ether or from carbon tetrachloride-petroleum ether gave the product as white needles, m.p. 40.5°–42.5°C. It has the formula

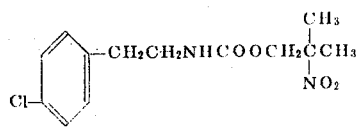

EXAMPLE 6

2-Methyl-2-nitropropyl 3,4-dihydroxy-β-phenyethylcarbamate

A mixture of 1.9 grams (0.010 mole) of dopamine hydrochloride, 3.08 grams of 2-methyl-2-nitropropyl chloroformate, 1.17 grams of sodium carbonate, 10 ml. of water, 10 ml. of tetrahydrofuran and 60 ml. of ethyl acetate was stirred at 10°C. for 30 minutes, and then at room temperature for another 90 minutes. The mixture was further diluted with 10 ml. of water and 40 ml. of ethyl acetate, and the organic phase was washed with 3 percent hydrochloric acid, water, and then dried over sodium sulfate. Evaporation of the solvent left an oil, most of which dissolved in 90 ml. of warm benzene. After decolorization with Nuchar C190–N on slow cooling, 1.35 grams of white crystalline product, m.p. 117°–121°C. was collected. A thin layer chromagram on Eastman 6060 sheets using a 9:1 benzene methanol developer with iodine detection gave a spot at $R_f 0.54$ and indicated that the product was essentially homogeneous. It has the formula

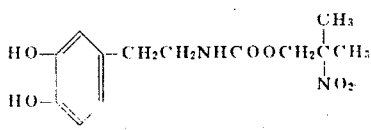

EXAMPLE 7

2-Methyl-2-nitropropyl 3,4-carbonyldioxy-β-phenylethylcarbamate

A mixture of 1.51 grams (0.008 mole) of dopamine hydrochloride, 2.4 grams of 2-methyl-2-nitropropyl chloroformate, 0.93 grams of sodium carbamate, 10 ml. of water, and 10 ml. of tetrahydrofuran and 50 ml. of ethyl acetate was reacted as in Example 6. The workup and purification yielded 2.0 grams of light colored oil that was homogeneous on thin layer chromatography. The oil was taken up into 40 ml. of chloroform and converted directly to the 3,4-carbonyldioxy product.

The chloroform solution of the 2-methyl-2-nitropropyl 3,4-dihydroxy-β-phenylethylcarbamate was cooled in an ice-propanol bath and 1.4 grams of triethylamine were added, followed by a solution of 2 grams of phosgene in 4 ml. of chloroform. The mixture was stirred in the bath for 20 minutes, then for another hour at room temperature. After washing with water the solution was dried over sodium sulfate. Evaporation of the solvent left 2.0 grams of straw colored oil. A TLC on Eastman 6060 chromagram sheet using 9:1 benzene-methanol developer showed the oil to be homogeneous with an R$_f$ 0.82. The product is insoluble in petroleum ether, soluble in benzene and toluene, and oils out of carbon tetrachloride. It has the formula

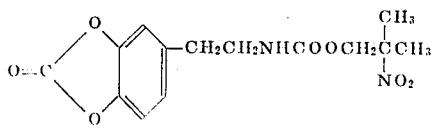

EXAMPLE 8

A. α-Carbomethoxybenzyl chloroformate

A solution of 53 grams of phosgene in 200 ml. of solvent A was maintained at 0–10°C. while 50 grams of methyl mandelate in 500 ml. of solvent A was added over 20 minutes with good stirring. A solution of 30 grams of triethylamine in 100 ml. of solvent A was added next over 20 minutes as a white precipitate formed, and then the mixture was stirred for 3½ hours out of the cooling bath. After this time 200 ml. of water was added cautiously. The organic phase was separated, washed with brine and dried over calcium chloride. Excess solvent was evaporated under vacuum and dry benzene was added to the residual oil to bring the concentration of α-carbomethoxylbenzyl chloroformate to 1 molar. This solution was used in subsequent carbamate ester preparations.

B. α-Carbomethoxybenzyl β-phenylethylcarbamate

A solution of 7.9 grams of β-phenylethylamine hydrochloride, 5.82 grams of sodium carbonate and 60 ml. of water was cooled to 10°. There was then added with good stirring over 10 minutes 60 ml. of 1 M α-carbomethoxybenzyl chloroformate solution and stirring was continued for 2 ½ hours. Chloroform was added and the organic phase was separated, washed with 100 ml. of 5 percent hydrochloric acid, 50 ml. of water, then dried over sodium sulfate. Evaporation of the solvent left an oil which crystallized on standing. Recrystallization from isopropyl ether gave 11 grams of α-carbomethoxybenzyl β-phenylethylcarbamate as white crystals, m.p. 85.5°–87.5°C. The product was homogeneous on thin layer chromatography using Merck silica gel G and a 95:5 benzene:methanol developer. It has the formula

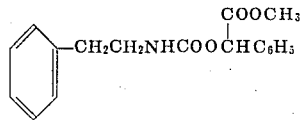

EXAMPLE 9

α-Carboxybenzyl β-phenylethylcarbamate

A small quantity of α-carbomethoxybenzyl β-phenylethyl carbamate was suspended in dilute sodium hydroxide in which it slowly dissolved with hydrolysis. Acidification provided α-carboxybenzyl β-phenylethylaminecarbamate as white crystals, m.p. 81–84–C., having the formula

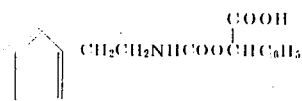

EXAMPLE 10

α-Carbomethoxybenzyl 4-chloro-β-phenylethylcarbamate

Using 7 grams of 4-chloro-β-phenylethylamine hydrochloride, 2.65 grams of sodium carbonate, 25 ml. of water and 50 ml. of 1 M α-carbomethoxybenzyl chloroformate solution, this reaction was run as in Example 8. Recrystallization of the product from petroleum ether (60°–110°) provided 13.8 grams of white crystals, m.p. 81°–82°C. It has the formula

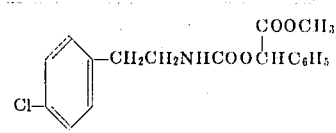

EXAMPLE 11

α-Carbomethoxybenzyl 3,4-dibenzyloxy-β-phenylethylcarbamate

A mixture of 10 grams of 3,4-dibenzyloxy-β-phenylethylamine hydrochloride, 3.53 grams of sodium carbonate, 40 ml. of water, 40 ml. of chloroform and chloroformate solution was reacted and worked up as in Example 8. Eventually there was isolated 18.6 grams of the product as an oil. This was dissolved in carbon tetrachloride and precipitated by the addition of petroleum ether. A thin layer chromatogram on Merck silica gel G using 95:5 benzene-methanol developer showed this product to be essentially homogeneous with an R$_f$ 0.74. It has the formula

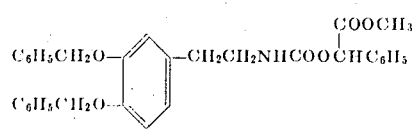

Hydrogenation in the presence of a platinum catalyst removes the benzyl radicals and produces α-carbethoxybenzyl β-(3,4-dihydroxyphenyl)ethylcarbamate.

I claim:

1. A compound of the formula

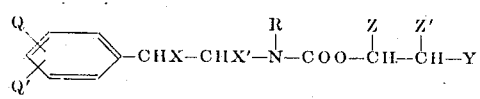

wherein Q and Q' are selected from hydrogen, halogen, hydroxyl, and benzyloxy substituents or together can be a carbonyldioxy radical, X is hydrogen or hydroxyl, X' is hydrogen or lower alkyl, R is hydrogen or lower alkyl, Z is lower alkoxycarbonyl, carboxyl or hydrogen, Z' is nitro, phenyl or hydrogen, and Y is hydrogen or lower alkyl, but Z and Z' are not both hydrogen.

2. A compound as defined by claim 1 wherein Z is lower alkoxycarbonyl and Z' and Y are hydrogen.

3. A compound as defined by claim 2 wherein R is hydrogen.

4. A compound as defined by claim 3 wherein X is hydroxyl and X' is methyl.

5. A compound as defined by claim 4 wherein Q and Q' are hydrogen.

6. A compound as defined by claim 2 wherein Z is hydrogen, Z' is nitro and Y is lower alkyl.

7. A compound as defined in claim 6 wherein X, X' and R are hydrogen.

8. A compound as defined by claim 7 wherein Q and Q' are hydroxyl.

9. A compound as defined by claim 2 wherein Z is carbalkoxyl or carboxyl, Z' is phenyl and Y is hydrogen.

10. A compound as defined by claim 9 wherein Q and Q' are benzyloxy.

* * * * *